Nov. 11, 1969    P. M. MOSER    3,478,211
INFRARED GRAY SCALE ARRAY
Filed Dec. 15, 1967
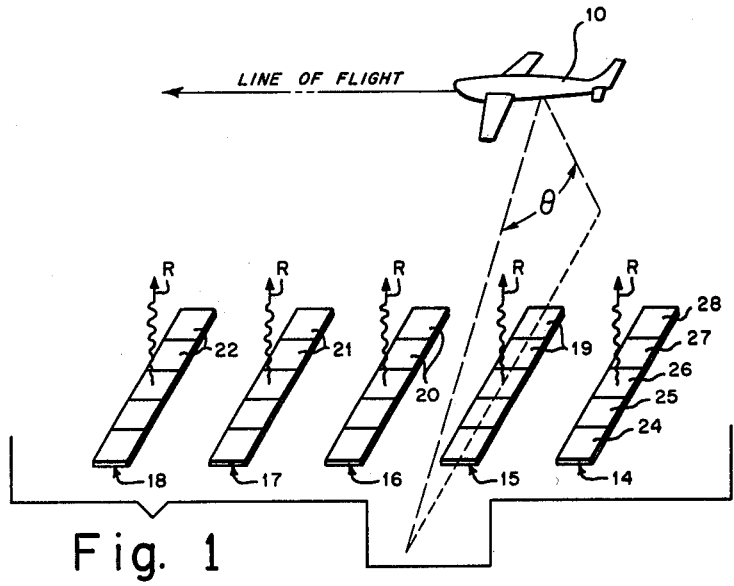
Fig. 1
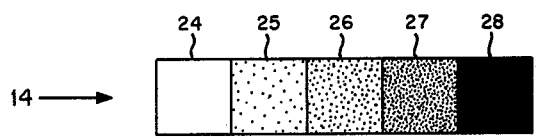
Fig. 2
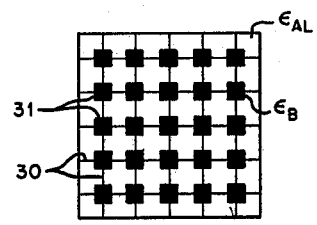
Fig. 2A
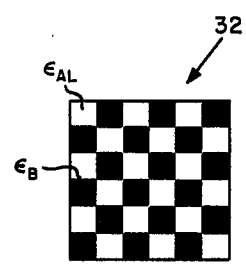
Fig. 2B
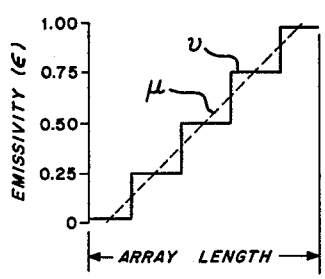
Fig. 3
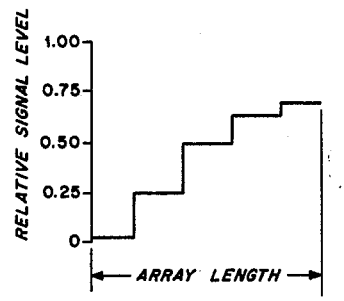
Fig. 4
INVENTOR.
PAUL M. MOSER
BY 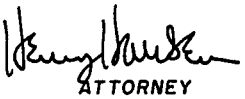
ATTORNEY

United States Patent Office 3,478,211
Patented Nov. 11, 1969

3,478,211
INFRARED GRAY SCALE ARRAY
Paul M. Moser, Abington, Pa., assignor to the United States of America as represented by the Secretary of the Navy
Filed Dec. 15, 1967, Ser. No. 690,810
Int. Cl. G01j 1/08, 1/14
U.S. Cl. 250—83      7 Claims

ABSTRACT OF THE DISCLOSURE

Panels composed of preselected discrete high and low emissivity areas such that the average emissivity per panel differs in accordance with a predetermined functional relationship are positioned in abutting contact with one another to provide a gray scale array for evaluating the fidelity with which airbourne infrared imaging devices translate various target radiances into corresponding shades of gray.

---

The invention described herein may be manufactured and used by or for the Government of the United States of America for governmental purposes without the payment of any royalties thereon or therefor.

BACKGROUND OF THE INVENTION

As is known by those skilled in the art, an infrared detector or like imaging device upon receiving infrared radiation will transmit into either film or a display varying shades of gray representative of the received radiation. Generally, the darker the gray, the hotter the object and, conversely, the lighter the gray, the cooler the object.

In testing and evaluating infrared equipment, it is desirable to provide therewith a gray scale which, in general, is composed of a succession of panels each of which is incrementally darker than the preceding one and each of which corresponds to a known temperature. With such a gray scale, an operator can make visual comparisons between the degree of "grayness" appearing on the film or display and the corresponding "grayness" of a particular panel of the gray scale. In this way, the operator can attain the temperature of the radiating object. This technique has found considerable application in the medical laboratory, for example, wherein infrared detectors and their associated gray scales are utilized to ferret out various types of cancer occurring in humans, as the malignant cancer cells generally appear hotter (and hence appear grayer) than healthy body tissue.

The prior art gray scale mentioned above consists of an array of electrically heated blackened metal panels the temperatures of which are controlled by thermostats and other electronic circuitry. Since the rate of radiation of electromagnetic energy from a black body is proportional to the fourth power of its absolute temperature, the radiancy of successive panels of such a gray scale is made incrementally greater by maintaining the successive panels at incrementally higher temperatures. This type of panel configuration, however, suffers from a number of limitations and disadvantages. For example, substantial cost is incurred in fabricating, installing, operating, and maintaining the array due to the elaborate electronic circuitry techniques needed to maintain the panels at incrementally different temperatures. In addition, a considerable amount of well regulated electric power is required to operate the array. Also, it is often extremely difficult and highly expensive to control both the differences in temperature between successive panels and the temperature uniformity across any individual panel to a fineness consistent with the sensitivities of existing infrared imaging devices. Another great disadvantage of such a gray scale is that the surface temperature of the panels, particularly those panels which are most black (most hot), fluctuate considerably and must be positioned in a controlled laboratory under highly controlled conditions to produce accurate results.

In general, there are four basic performance tests which are conducted upon infrared detection equipments. These tests may be described as, respectively, spatial resolution, thermal resolution, geometric fidelity, and gray scale rendition. The first two tests are resolution tests and therefore provide a measure of the infrared detector's ability to distinguish between nearly equal values of a quantity. Here the quantities are, respectively, the minimum detectable separation between two targets and the minimum detectable temperature difference between those two targets. The third test, geometric fidelity, affords a measure of the equipment's ability to distinguish the various geometric angles and curves of the aforementioned targets. The last test, gray scale rendition, measures the infrared equipment's ability to distinguish a minimum change in contrast or degree of difference in tone between the lightest and darkest areas of a particular target. A gray scale array is utilized in this test for comparison with the film or display, as mentioned heretofore.

As infrared detection equipments are now utilized in aircraft for aerial reconnaissance purposes, it is often desirable to mount the equipment in an aircraft and conduct the aforementioned performance tests thereon during actual inflight conditions. There is thus a need for infrared gray scale arrays suitable for use in an outdoor environment. Such a gray scale would, however, have to be considerably larger than the presently existing laboratory models and would also have to be insensitive to variations in temperature caused by wind currents.

Many infrared detectors are best suited to provide grayness indications that are not comparable with a linear-type gray scale. That is, many detectors may provide information which can best be compared with a gray scale that is, for example, logarithmically constructed, or exponentially constructed, or for that matter, constructed to exhibit any predetermined functional relationship.

Thus, a gray scale array that can be used in an out-of-door environment and which can also be constructed of rather large panels is highly desirable. In addition, a gray scale having the above properties which may also be constructed to exhibit any preselected functional relationship is, again, highly advantageous.

SUMMARY OF THE INVENTION

Accordingly, it is the general purpose of this invention to provide an array of panels each of which may be positioned in such a manner as to provide a gray scale which exhibits any preselected functional relationship, may be of any desired size, and requires no electrical circuitry to heat the panels to controlled temperatures.

The invention utilizes the scientific principle known as Stefan's Law, stated below as Equation 1.

Equation (1)
$$R = \sigma_\epsilon T^4$$

where,

R is the rate of emission of radiant energy per unit area or the target radiancy and is expressed in ergs per second per square centimeter, in the c.g.s. system, and in watts per square meter in the mks. system. The constant $\sigma$ has a numerical value of $5.672 \times 10^{-5}$ in c.g.s. units and $5.672 \times 10^{-8}$ in mks. units. T is the Kelvin (Absolute) temperature of the surface and $\epsilon$ is the emissivity of the surface. The emissivity lies between zero and unity, depending upon the nature of the surface. The emissivity of copper, for example, is about 0.03 while that of polished aluminum is about 0.02. In general, the emissivity is larger for rough and smaller for smooth, polished surfaces.

The equation states that the target radiancy R can be varied by varying either the emissivity $\epsilon$, the temperature T, or both. Applicant provides a gray scale array wherein the emissivity $\epsilon$ is varied, the temperature T being constant.

The invention includes a gray scale array composed of panels of varying emissivity, each of which may be comprised, for example, of a sheet of polished aluminum (emissivity=0.02) having secured thereon varying quantities of geometric figures or other predeterminedly shaped objects of varying sizes such that the overall average emissivity for any particular panel exhibits an apparent, predetermined value. Conversely, the array may comprise a plurality of panels composed of a blackened material having secured thereto varying amounts of highly reflective figures or shapes per panel to again achieve a predetermined average emissivity. By arranging these panels in a manner to be hereinafter explained, any prescribed functional relationship in gray scale variation may be attained.

BRIEF DESCRIPTION OF THE DRAWING

FIG. 1 is a view of a possible gray scale rendition test run utilizing the present invention;

FIG. 2 is a view of one of the gray scale arrays and the panels associated therewith of FIG. 1;

FIG. 2A is a view of a particular panel configuration in accordance with the invention;

FIG. 2B is a view of another panel configuration in accordance with the invention;

FIG. 3 is a graph of the emissivity characteristics of the gray scale array of FIG. 2;

FIG. 4 is a possible infrared detector response to the gray scale array of FIG. 2.

DESCRIPTION OF THE PREFERRED EMBODIMENT

Referring now to the drawing, and more particularly to FIG. 1, there is shown a typical gray scale rendition test run wherein an aircraft 10 carrying an infrared detecting device (not shown) is flown over a plurality of gray scales 14 through 18, inclusive, positioned on the ground as shown.

The aircraft 10 is provided with an aperture (not shown) which serves as the receiving point for incident infrared radiation R. Radiation thus received is then sensed and converted by the suitable optical and electromechanical transducer elements of the infrared detector for presenting the infrared pattern on either film or a display such as an oscilloscope or storage tube. The aperture angle of the detector is shown as $\theta$. The infrared equipment scans the scene below the aircraft through this angle which, as shown, is at right angles to the line of flight.

On the ground are positioned a plurality, here five, of gray-scale arrays 14, 15, 16, 17 and 18 in straight line configuration. Each array is composed, for example, of a plurality of panels such as panels 24 through 28, inclusive of array 14 arranged to exhibit a predetermined functional relationship determined by the emissivity variation therebetween. The exact nature of the above-mentioned functional relationship and the associated emissivity variation will be described hereinafter.

Some of the more useful functional relationships are (1) linear step functions; (2) exponential step; (3) logarithmic step; (4) inverse square law step; (5) square law step. Consequently, the emissivity variation between the panels of array 14 is so adjusted that the array exhibits a linear step function relationship. Similarly, arrays 15 through 18, inclusive, have their respective panels 19 through 22, inclusive, adjusted to exhibit the other above-mentioned predetermined functional relationships. Of course, as other functional relationships are desired, arrays can be constructed to exhibit them. Accordingly, the invention is not to be restricted solely to the relationships stated above.

In operation, an infrared detector is carried by the aircraft 10 which is flown at night over the arrays 14–18, inclusive. Infrared radiation R radiating from the gray scales as well as infrared radiation from the surrounding terrain is scanned by the infrared detector and is absorbed thereby through the aperture. Radiation thus received is converted by the aforementioned optical and electromechanical transducing elements and is recorded on film, for example.

An examination of the recorded information will reveal the gray scale rendition capability of the infrared detector. This can best be seen with reference to FIGS. 2, 3, and 4.

In FIG. 2 is shown a typical gray scale array 14 such as might be used in the test run of FIG. 1. Of course any number of panels may be provided as desired, five (5) being here shown for convenience. The emissivity of each panel is predetermined, in a manner hereinafter described, as set forth in the table below.

TABLE 1.—EMISSIVITY VARIATION PER PANEL FOR A TYPICAL FIVE PANEL LINEAR STEP FUNCTION ARRAY

| Panel No.: | Emissivity |
| --- | --- |
| 24 | 0.02 |
| 25 | 0.26 |
| 26 | 0.50 |
| 27 | 0.74 |
| 28 | 0.98 |

This result is also shown graphically in FIG. 3 wherein emissivity $\epsilon$ is plotted as a function of gray scale array length.

From Table 1 it is seen that the difference in emissivity between any two adjacent panels is constant at 0.24. Thus, each successive ascending step shown in FIG. 3 is higher (in emissivity content) than the preceding one by this value. It should be obvious, however, that an emissivity difference of 0.24 has been chosen for convenience only, any other difference also being possible.

As seen in FIG. 3, the contribution of each successive panel yields a step-like change $v$ in emissivity which can be made to closely approximate the ramp $u$ (if desired) merely by adding panels of intermediate emissivity. For example, if four panels of emissivity 0.55, 0.60, 0.65, 0.70, respectively, were added between panels 26 and 27, a linear ramp variation therebetween becomes apparent. Conversely, if a step increase were desired, the array 14 serves very adequately.

Alternatively, if a ramp function were desired, the average emissivity can be made to vary continuously over one long panel, which would then comprise the entire array, rather than providing many panels of small discrete emissivity differences.

A possible detector response to the radiation received from gray scale 14 is shown in FIG. 4. The graph reveals that the gray scale rendition capability of the detector is somewhat distorted at the upper end of the detector's operating range. That is, the equipment's response to those shades of gray contributed by panels 27 and 28 is no longer characteristic of a linear step function relationship. Instead, the detector is seen to severely attenuate the contributions of these higher emissivity panels. Thus, the gray scale rendition capability of the detector may be quantitatively evaluated. It is to be noted, however, that for some applications the detector response as shown in FIG. 4 may be the desired response. It is entirely possible that the principal region of interest may lie at the lower end of the graph where the emissivities are correspondingly low.

If this be the case, it may be desirable to construct a linear step function gray scale array wherein a plurality of panels have their emissivities distributed linearly over the range from approximately zero to 0.5.

It is also noted that many functional relationships may be derived merely by properly positioning linear step array 14. For example, two arrays 14 placed end to end (i.e., the panel of highest emissivity of the first array placed adjacent to the panel of lowest emissivity of the second array) would exhibit a repetitive linear step function characteristic. Also, if two arrays 14 were placed back to back (i.e., the panel of highest emissivity of the first array placed adjacent to the panel of highest emissivity of the second array) a triangular functional relationship would occur.

While the infrared detector's response to the gray scale patterns exhibited by arrays 15–18, inclusive, has not been set forth, it is to be understood that each such response will differ both from each other and from the detector's response to the linear step array 14. Furthermore, each such response will provide data indicative of the gray scale rendition capability of the detector to the various types of functional relationships exhibited. These data will be of use for comparison purposes with the responses obtained from a plurality of actual physical targets (as trucks on various types of roads, ships at sea, roof tops, cooking fires, and others). Thus, for example, if it is found that the above-mentioned physical targets exhibit an exponential grayness distribution with most of the desired information appearing at one end of the curve (i.e., near ambient temperature) and the remainder distributed over wide ranges of temperature thereby appearing at the other end (as radiation from cooking fires), it may be desirable to compare this response with a gray scale array that is exponentially distributed with respect to the per panel emissivity distribution.

A preferred means for constructing an array such as that shown in FIG. 2 will now be described. The gray scale array of FIG. 2 is comprised of a plurality of panels all of which are at the same temperature (ambient) but whose average emissivities differ incrementally over the range from 0 to 1. The average emissivity of any given panel is established by constructing it such that its radiating surface consists of proportionate amounts of high and low emissivity material uniformly distributed throughout the panel in the form of small geometrical figures (squares, circles, rectangles, etc.) or the like. For example, the panel in FIG. 2 whose emissivity is 0.50, panel 26, would have 50% of its surface composed of a material of emissivity approximately equal to 1 (such as asphalt or black paint) and the remaining 50% composed of a material of emissivity approximately equal to 0 (such as polished aluminum). It is noted that while an emissivity of 1 or 0 can be closely approximated, no material has an emissivity equal exactly either to 1 or 0. Therefore, some slight adjustments in the actual relative percentages of material utilized per panel may be necessitated. However, to simplify the discussion here, this slight inaccuracy may be ignored.

Some dimensional constraints are imposed by the infrared detector itself. For example, the simple geometric figures noted above should be small in size compared with the size of the panel on which they are mounted and small compared with the ground resolution capability of the infrared detecting device. Also, the distances between the simple geometric figures should be kept small. This is because the geometrical figures should not be resolvable by the infrared detecting device but rather the entire panel should be resolvable so as to exhibit an average panel emissivity. Another requirement is that the size of the geometrical figures should be large with respect to the wavelengths of the electromagnetic radiation of interest. In addition, the panels should be large as compared with ground resolution capability of the infrared detector if the panels are to serve as extended area targets, and small if they are to serve as point sources.

In a particular embodiment of the invention, each panel might consist of a 6′ x 6′ sheet of polished aluminum having an emissivity of 0.02 on which a rectangular grid of lines 30 spaced at 3-inch intervals is established, as shown in FIG. 2A. At the intersection of each pair of perpendicular gridlines a small black square 31 of emissivity approximately equal to 0.95 or greater as from paint, anodized aluminum, cloth, or other material is placed. On a given panel all the small black squares would be of the same size. The average emissivity $\epsilon$ of each panel could then be calculated from the following formula.

Equation 2:

$$\epsilon = \epsilon_{AL} + \frac{(\text{area of each black square})(\epsilon_B - \epsilon_{AL})}{(\text{grid spacing})^2}$$

where, $\epsilon_B$ = emissivity of the black square and $\epsilon_{AL}$ = emissivity of the polished aluminum.

Since the only variable on the right-hand side in the above equation is the "area of each black square," changing this area (increasing or decreasing the size of the black squares) will change the average emissivity. Thus, by constructing the various panels in accordance with the above equation, the average emissivity for any given panel can be preselected and obtained. Then, by arranging the panels in the desired order to form an array any functional relationship in emissivity can be achieved.

It should also be obvious that the same result may be obtained by placing squares of low emissivity at the intersections of gridlines scribed on a panel of high emissivity. Similarly, other geometric figures may be substituted for the squares.

FIG. 2B shows a panel 32 which has an average emissivity of 0.5. This is achieved by placing equal amounts of high emissivity material $\epsilon_B$ next to equal amounts of low emissivity material $\epsilon_{AL}$. The checkerboard pattern thus generated illustrates the manner in which high emissivity material may be uniformly distributed over the surface of a panel of low emissivity material (or vice versa) to obtain an average panel emissivity. In like manner, by uniformly distributing preselected amounts of high emissivity material on panels of low emissivity material, any average emissivity (between the limits from 0.0 to 1.0) can be obtained.

FIG. 2B is a special case of the panels shown in FIG. 2. In the latter figure, preselected amounts of high emissivity material are randomly placed (though uniformly distributed) upon panels of low emissivity material such that the ratio of the area covered by the high emissivity material to the remaining area of low emisivity material yields the desired average emissivity for a given panel. Thus, the average emissivity of panel 24 is constructed to be as close to zero as is physically possible as, for example, constructed wholly of polished aluminum. Panel 25 contains polished aluminum with a sufficient spattering of high emissivity material to yield an average emissvity of 0.26. Similarly, the emissivity of panel 26 is constructed to be 0.50. The remaining panels are similarly constructed. By lining the panels up in the order of increasing emissivity, the linear step function relation $v$ of FIG. 3 results.

It is noted that when the panels are positioned flat on the ground as shown in FIG. 1, the apparent temperature of the panel of lowest emissivity (and therefore highest reflectivity) 24 will be equal approximately to the effective radiation temperature of the sky or ceiling. The apparent temperature of the panel of highest emissivity 28 will be equal approximately to the true ambient temperature. The remaining panels will exhibit intermediate apparent temperatures which are related to each other and may be calculated.

Since the gray scale arrays operate due to differences in panel emissivity, rather than from differences in panel temperature, it should thus be apparent that the present invention may be utilized out-of-doors, electrically heated panels and the problem of heat loss and transfer by wind currents being eliminated.

The array is a very low cost, very easily fabricated item. Precise establishment of panel emissivities may be achieved through the use of a relatively simple mathematical formulation. There are no particular size limitations (except those dictated by the detecting device, as noted above) and the array may therefore be utilized indoors as well as out. In this regard, it is possible to construct an array in accordance with the invention of sufficiently small size such that it may be built directly into the infrared equipment for testing the detector for satisfactory performance prior to actual takeoff.

It should also be apparent that any desired functional relationship between emissivity and panel number can be established merely by choosing the proper amount of blackened area per panel relative to the adjacent panels. Thus, if a logarithmic gray scale were desired the average emissivity of each successive panel would be constructed to follow the familiar $Y=\log x$ curve. Similarly, exponentials, square law, and various other functional relationships can be established. Moreover, fewer or more numerous panels may be provided to attain, respectively, more abrupt or smoother emissivity transitions. Further, it is noted that while Equation 2 is suited for obtaining the average emissivity per panel when the above-referred to geometric figures are squares, it is obvious that analogous equations can be derived as desired for obtaining the average emissivity when the geometrical figures are of some other prescribed shape.

As the gray scale arrays reflect and/or radiate electromagnetic radiation of which infrared is but a small part, the invention is not restricted to the infrared region only but is useful with both visible light devices (as photographic, television, image intensifiers, etc.) and microwave devices (as, side-looking radar and microwave radiometers) provided the previously mentioned dimensional limitations imposed by the resolution capability of the respective detecting devices are taken into account.

Accordingly, it is to be understood that the above-described arrangements are illustrative of the application and principles of the inventions and of a preferred embodiment for the practicing thereof. It will, of course, be recognized that numerous modifications and alterations may be made in the above-described gray scale array without departing from the spirit and scope of the invention as set forth in the appended claims.

I claim:
1. A gray-scale array for evaluating the fidelity with which an infrared detector translates various target radiancies into corresponding shades of gray comprising:
a plurality of adjacent panels positioned to exhibit a predetermined functional relationship of emissivity along a selected axis of said array; and
discrete areas per panel of high and low emissivity content uniformly distributed over each surface thereof in accordance with said predetermined functional relationship.

2. The invention according to claim 1 wherein said high emissivity areas include a plurality of geometric figures and said low emissivity areas include the interspace therebetween.

3. The invention according to claim 1 wherein said low emissivity areas include a plurality of geometric figures and said high emissivity areas include the interspace therebetween.

4. A gray-scale array for evaluating the fidelity with which an infrared detector translates various target radiances into corresponding shades of gray, comprising:
a plurality of adjacent panels positioned to exhibit a predetermined functional relationship of emissivity along a selected axis of said array; and
discrete areas per panel of high and low emissivity content uniformly distributed over each surface thereof in accordance with said predetermined functional relationship, said discrete areas including a crisscrossed grid configuration on each panel surface having at the intersection of each pair of crisscrossed grids a geometric figure of emissivity different from that of the remaining interspaces.

5. The invention according to claim 4 wherein said discrete areas per panel include high and low emissivity areas determined by the formula:

$$\epsilon = \epsilon_{AL} + \frac{(\text{area of each black square})(\epsilon_B - \epsilon_{AL})}{(\text{grid spacing})^2}$$

where, $\epsilon$ is the average panel emissivity, $\epsilon_{AL}$ is the emissivity of the low emissivity area, and $\epsilon_B$ is the emissivity of the high emissivity area.

6. A method for testing and evaluating the fidelity with which an airborne infrared detector translates various target radiances into corresponding shades of gray comprising the steps of:
positioning a plurality of varying emissivity gray-scale arrays on the ground;
flying the detector at night over and at right angles to selected axes of the plurality of gray-scale arrays;
taking an infrared picture of the arrays; and
comparing this picture with infrared responses obtained from other physical targets.

7. The method according to claim 6 wherein the positioning step includes:
placing in abutting contact at least a first plurality of individual panels exhibiting therebetween a predetermined functional relationship of emissivity along a selected axis of said array.

References Cited

UNITED STATES PATENTS 3,227,879   1/1966   Blau et al. _____ 250—84

RALPH G. NILSON, Primary Examiner

D. L. WILLIS, Assistant Examiner

U.S. Cl. X.R.

250—84